(12) United States Patent
Keegan et al.

(10) Patent No.: US 10,457,391 B2
(45) Date of Patent: Oct. 29, 2019

(54) METHOD AND SYSTEM FOR A SMALL UNMANNED AERIAL SYSTEM FOR DELIVERING ELECTRONIC WARFARE AND CYBER EFFECTS

(71) Applicant: Selex Galileo Inc., Arlington, VA (US)

(72) Inventors: Matthew Keegan, McLean, VA (US); Stephen Leonard Engelson Wyatt, Diamondhead, MS (US)

(73) Assignee: SELEX GALILEO INC., Arlington, VA (US)

( * ) Notice: Subject to any disclaimer, the term of this patent is extended or adjusted under 35 U.S.C. 154(b) by 646 days.

(21) Appl. No.: 15/071,018

(22) Filed: Mar. 15, 2016

(65) Prior Publication Data
US 2018/0009525 A1  Jan. 11, 2018

(51) Int. Cl.
| | | |
|---|---|---|
| *B64C 39/02* | (2006.01) | |
| *B64C 3/26* | (2006.01) | |
| *B64C 3/38* | (2006.01) | |
| *B64C 39/10* | (2006.01) | |
| *H04K 3/00* | (2006.01) | |

(52) U.S. Cl.
CPC .......... *B64C 39/024* (2013.01); *B64C 3/26* (2013.01); *B64C 3/38* (2013.01); *B64C 39/10* (2013.01); *H04K 3/20* (2013.01); *B64C 2201/021* (2013.01); *B64C 2201/042* (2013.01); *B64C 2201/121* (2013.01); *B64C 2201/162* (2013.01)

(58) Field of Classification Search
CPC ......... B64C 39/024; B64C 39/10; B64C 3/34; H04K 3/20
See application file for complete search history.

(56) References Cited

U.S. PATENT DOCUMENTS

| | | | | |
|---|---|---|---|---|
| 3,208,696 A | * | 9/1965 | Kastan | B64D 37/04 244/135 R |
| 5,242,132 A | | 9/1993 | Wukowitz | 244/106 |

(Continued)

FOREIGN PATENT DOCUMENTS

| | | | | |
|---|---|---|---|---|
| DE | 102008024463 | | 12/2009 | ............. B64D 27/14 |
| DE | 202015007089 | | 12/2015 | ............. B64D 27/24 |

OTHER PUBLICATIONS

Press, "NASA—Prandtl-D Aircraft", Oct. 30, 2015, https://www.suasnews.com/2015/10/nasa-prandtl-d-aircraft/ (Year: 2015).*

(Continued)

*Primary Examiner* — Michael H Wang
(74) *Attorney, Agent, or Firm* — Hayes Soloway P.C.

(57) ABSTRACT

A system and method for conducting electronic warfare on a target site includes the use of a small unmanned aircraft system (SUAS) having a fuselage and a Prandtl wing, wherein at least two electric ducted fans are positioned on the fuselage. A power system of the SUAS has a plurality of hydrogen fuel cells positioned within the Prandtl wing. An electronic warfare payload is carried by the fuselage, wherein the electronic warfare payload and the at least two electric ducted fans are powered by at least a portion of the plurality of hydrogen fuel cells. During an operation, the SUAS may launch near an IAD site and initiate an electronic warfare effect on an integrated air defense site with electronic warfare payload carried by the SUAS to interfere with at least one surface-to-air missile (SAM) system.

33 Claims, 11 Drawing Sheets

(56) References Cited

U.S. PATENT DOCUMENTS

| | | | | |
|---|---|---|---|---|
| 5,803,402 | A | 9/1998 | Krumweide et al. | 244/117 R |
| 5,899,409 | A * | 5/1999 | Frediani | B64C 39/068 244/13 |
| 7,883,060 | B2 * | 2/2011 | Phillips | B64C 3/52 244/203 |
| 8,141,819 | B2 * | 3/2012 | Brock | B64C 39/024 244/120 |
| 8,201,773 | B1 | 6/2012 | Durham et al. | 244/49 |
| 9,382,000 | B1 * | 7/2016 | Bowers | B64C 23/065 |
| 2003/0075643 | A1 * | 4/2003 | Dunn | B64D 27/24 244/59 |
| 2003/0141409 | A1 | 7/2003 | Lisoski et al. | 244/13 |
| 2008/0198060 | A1 * | 8/2008 | Shani | G01S 7/021 342/14 |
| 2011/0127373 | A1 * | 6/2011 | Thomas | B64C 1/34 244/65 |
| 2013/0240671 | A1 * | 9/2013 | Kruse | B64C 3/185 244/123.9 |
| 2015/0048207 | A1 * | 2/2015 | Williams | B64C 3/00 244/123.7 |
| 2015/0069184 | A1 * | 3/2015 | Barmichev | B64D 37/04 244/135 R |
| 2016/0009402 | A1 * | 1/2016 | Hunter | B64D 27/24 244/53 R |
| 2017/0197701 | A1 * | 7/2017 | Gielda | B64C 3/36 |
| 2017/0305524 | A1 * | 10/2017 | Moxon | B64C 3/00 |

OTHER PUBLICATIONS

James, Jack, "New Wing Design Exponentially Increases Total Aircraft Efficiency", <https://technology-afrc.ndc.nasa.gov/featurestory/prandtl-wing-design> (Year: 2015).*

Frediani, Aldo, "The Prandtl Wing", V K I, Lecture series: "Innovative Configurations and Advanced Concepts for Future Civil Transport Aircraft", Jun. 6-10, 2005 (Year: 2005).*

Bjorkman, James, "Horten Flying Wing", World War II in Pictures, Oct. 19, 2014, <http://worldwartwo.filminspector.com/2014/10/horten-flying-wing.html> (Year: 2014).*

Bjorkman, J., "Horten Flying Wing," Oct. 2014, retrieved from http://woldwartwo.filminspector.com/2014/10/horten-flying-wing.html (12 pgs).

International Search Report and Written Opinion issued in application No. PCT/US17/21921, dated May 24, 2017 (12 pgs).

Krum, C., "Electric Airbus Kills Your Excuses for Not Having a Pilot's License," Jun. 2015, retrieved from http://jalopnik.com/electric-airbus-kills-your-excuses-for-not-having-a-pil-1710820730 (7 pgs).

International Preliminary Report on Patentability issued in application No. PCT/US2017/021921, dated Mar. 26, 2019 (9 pgs).

* cited by examiner

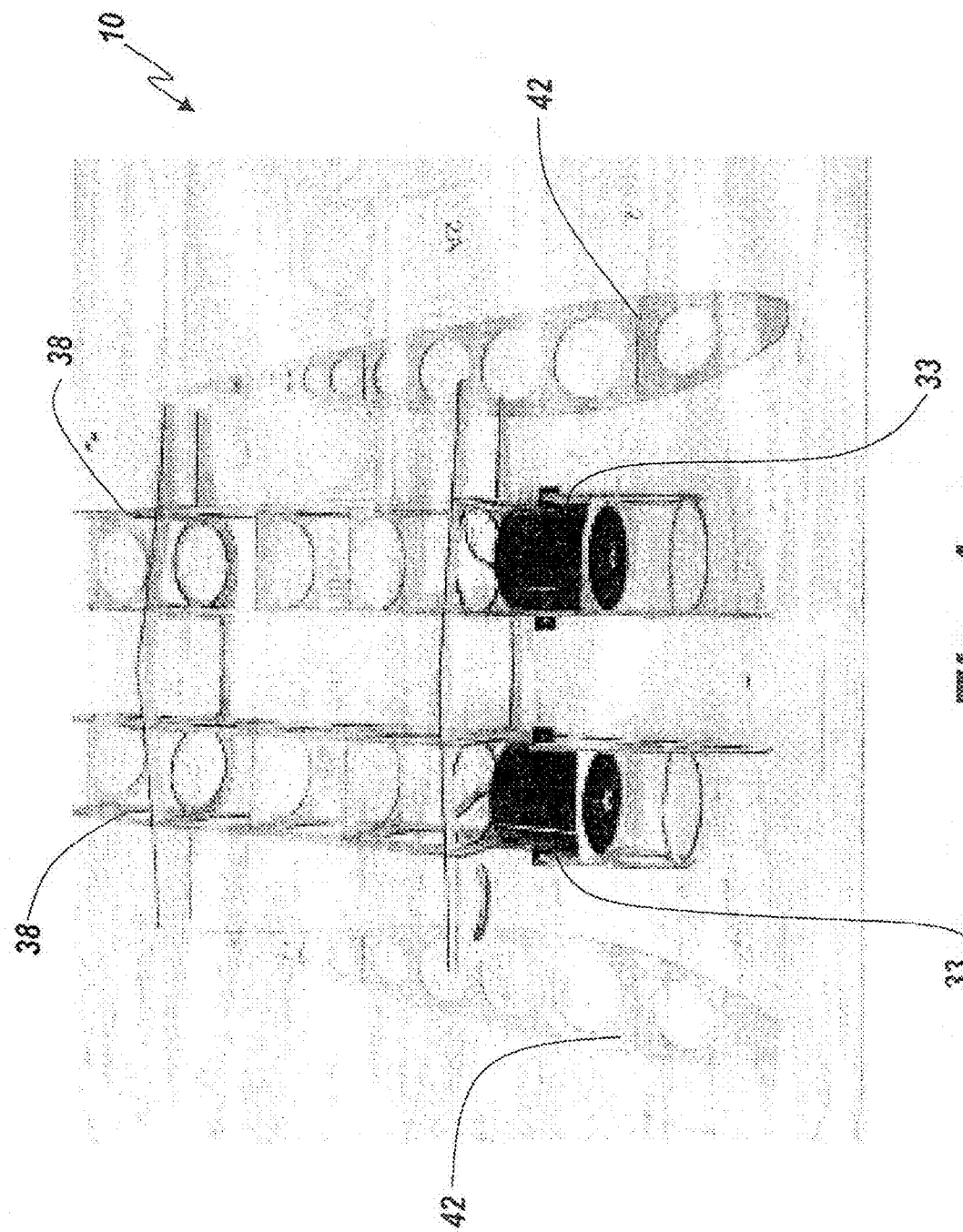

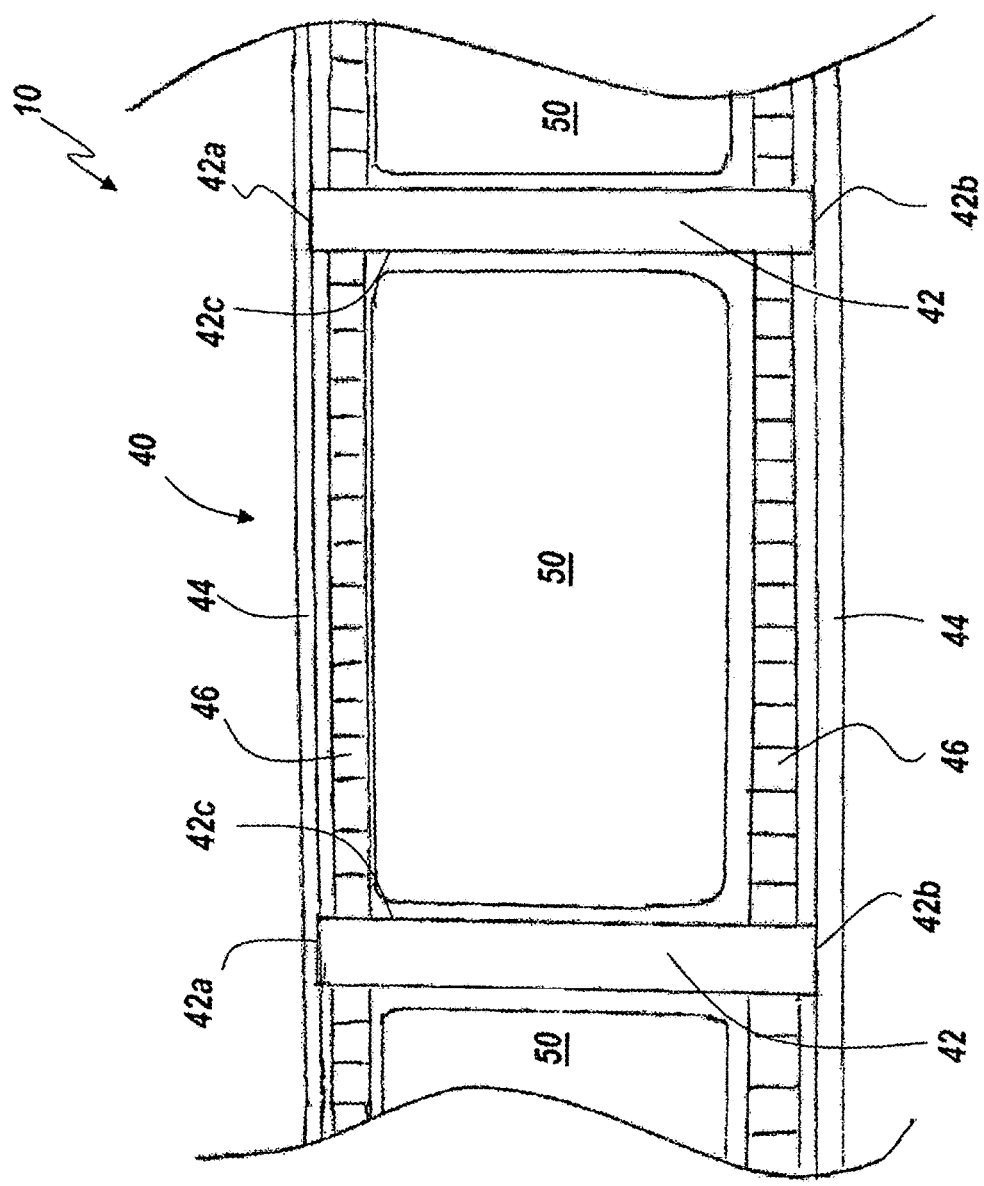

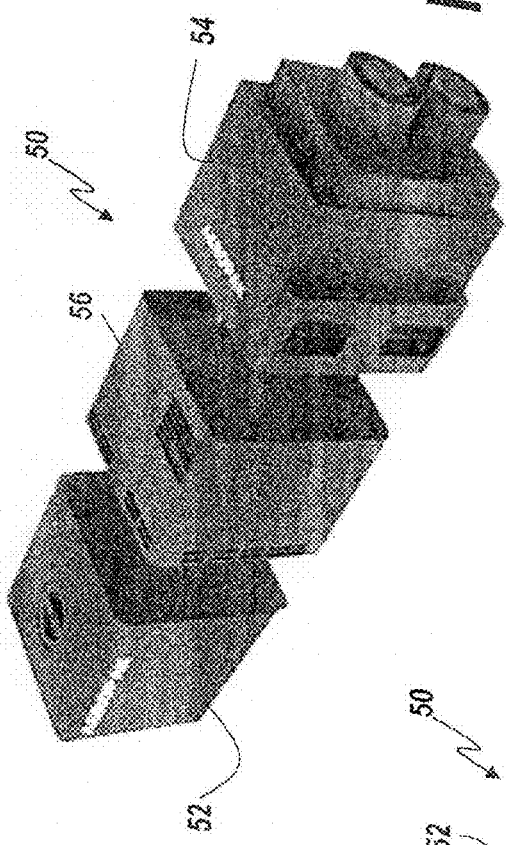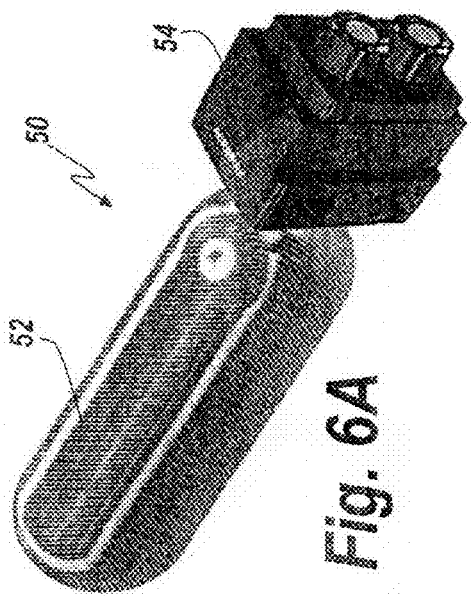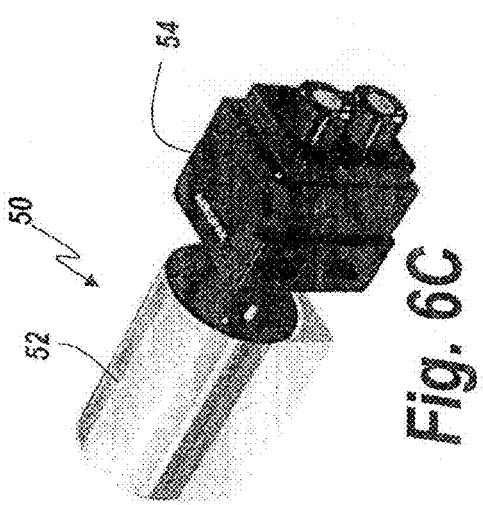

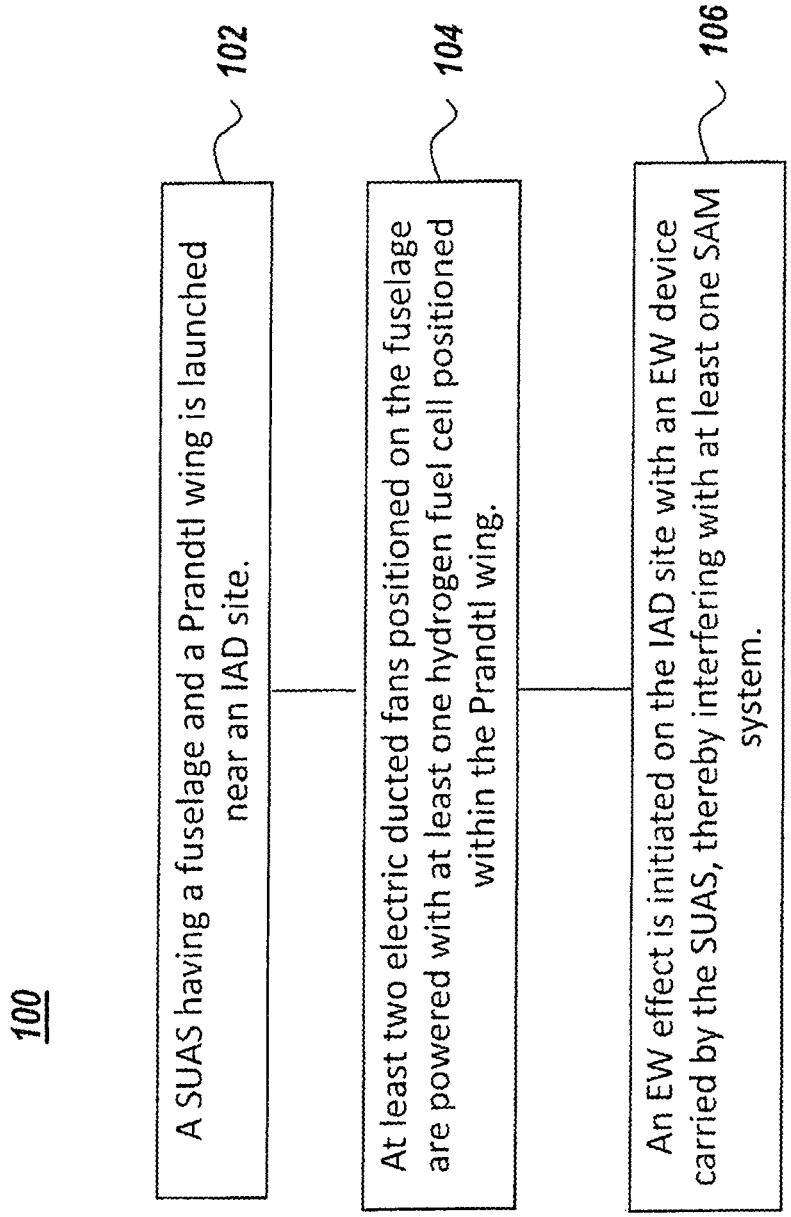

METHOD AND SYSTEM FOR A SMALL UNMANNED AERIAL SYSTEM FOR DELIVERING ELECTRONIC WARFARE AND CYBER EFFECTS

FIELD OF THE DISCLOSURE

The present disclosure is generally related to unmanned aerial systems and more particularly is related to methods and systems for a small unmanned aerial system for delivering electronic warfare and cyber effects.

BACKGROUND OF THE DISCLOSURE

Surface-to-air missile (SAM) systems are increasingly employed in warfare to counteract the use of aircraft. SAM systems generally utilize one or more missiles designed to be launched from the ground to destroy aircraft or other objects, such as other missiles. The proliferation of advanced SAM systems creates an increased difficulty for military forces to establish and maintain air dominance over disputed territory or in air corridors that must be established for brief periods of time.

Current methods of countering SAM systems may involve the use of expensive, complex, manned air assets, generally referred to as anti-SAM assets. These manned, Suppression of Enemy Air Defenses (SEAD) assets often carry electronic warfare (EW) devices which are intended to permanently or temporarily disable the SAM systems by using directed energy to control the electromagnetic spectrum to destroy, interfere, or otherwise disrupt the electronic controls used by SAM systems. The directed energy may include, for example, radio frequencies, radar frequencies, and/or infrared (IR), visible, ultraviolet, and other less used portions of the EM spectrum. Examples of the type of EW that can be achieved include self-protection, standoff, and escort jamming, and antiradiation attacks utilizing devices such as Digital Radio Frequency Memory (DRFM) systems or other spoofing and/or jamming systems.

In order to properly counter SAM systems, the SEAD assets must be able to achieve a position that is relatively close to the SAM systems. For example, many SEAD assets must be present in the field of range of most SAM systems in order to initiate EW measures. Depending on the type of EW being directed to the SAM systems, the SEAD assets may be required to remain within the field of range of the SAM systems to sustain the EW effect for the duration of the mission. The SEAD (e.g. F-16s, EF-18Gs, et al.) assets are commonly large enough to be detected by the SAM systems, and therefore, are themselves threatened by the SAM systems they are designed to defeat.

Thus, a heretofore unaddressed need exists in the industry to address the aforementioned deficiencies and inadequacies in the ability to conduct EW related SEAD missions without risking expensive, manned assets.

SUMMARY OF THE DISCLOSURE

Embodiments of the present disclosure provide a small unmanned aircraft system (SUAS) for interfering with an Integrated Air Defense. Briefly described, in architecture, one embodiment of the SUAS, among others, can be implemented as follows. The SUAS includes an airframe having a fuselage and a Prandtl wing. A power system of the SUAS has one or a plurality of hydrogen fuel cells positioned within the Prandtl wing. At least two electric ducted fans are positioned on the fuselage, wherein the at least two ducted fans are powered by at least a portion of the plurality of hydrogen fuel cells.

In one aspect, the fuselage may further comprise a Ho 229 fuselage.

In another aspect, each of the at least two electric ducted fans positioned on the fuselage may further comprise an inlet positioned on a front surface of the fuselage and an outlet positioned on a top surface of the fuselage.

In another aspect, the Prandtl wing may further comprise a Prandtl-D wing.

In yet another aspect, the Prandtl wing may further comprise two Prandtl wing structures, each removably connectable to the fuselage with a mechanical locking mechanism.

In another aspect, a wingspan of the Prandtl wing is substantially between 72 inches and 120 inches.

In another aspect, the Prandtl wing may further comprise two Prandtl wing structures, wherein each of the two Prandtl wing structures is formed from at least two trusses connected with a carbon fiber wing skin, wherein the carbon fiber wing skin is bonded to terminating edges of the at least two trusses.

In another aspect, the at least one or the plurality of hydrogen fuel cells is positioned between the at least two trusses.

In another aspect, the at least two trusses are connected to at least one spar with an adhesive material and at least one mortise and tenon joint.

In another aspect, an internal wing skin is positioned interior of the carbon fiber wing skin, wherein the internal wing skin comprises an extruded hexagonal composite material.

In another aspect, the internal wing skin is positioned between opposing sidewalls of the at least two trusses.

In another aspect, the extruded hexagonal composite material of the internal wing skin is sandwiched between a substrate of the internal wing skin and the carbon fiber wing skin.

In yet another aspect, an electronic warfare (EW) payload is carried by the fuselage. In this aspect, the EW payload may be carried by the fuselage between the at least two electric ducted fans. Also, in this aspect, the EW payload may receive power from at least one or the plurality of hydrogen fuel cells.

The present disclosure can also be viewed as providing a system/apparatus for conducting electronic warfare on a target site. Briefly described, in architecture, one embodiment of the system, among others, can be implemented as follows. A SUAS has a fuselage and a Prandtl wing, wherein at least two electric ducted fans are positioned on the fuselage. A power system is integrated into the SUAS, the power system having one or a plurality of hydrogen fuel cells positioned within the Prandtl wing. An EW payload is carried by the fuselage, wherein the EW payload and the at least two electric ducted fans are powered by at least one or the plurality of hydrogen fuel cells.

In one aspect, the EW payload further comprises a Digital Radio Frequency Memory Expendable Active Decoy (DRFM EAD).

In another aspect, the Prandtl wing further comprises two Prandtl wing structures, wherein each of the two Prandtl wing structures is formed from at least two trusses connected with a carbon fiber wing skin, wherein the carbon fiber wing skin is bonded to terminating edges of the at least two trusses, and wherein an internal wing skin comprising an extruded hexagonal composite material is positioned abutting the carbon fiber wing skin.

In yet another aspect, the at least one or the plurality of hydrogen fuel cells is positioned between the at least two trusses.

The present disclosure can also be viewed as providing methods of interfering with an Integrated Air Defense (IAD). In this regard, one embodiment of such a method, among others, can be broadly summarized by the following steps: launching a SUAS having a fuselage and a Prandtl wing near an IAD site; powering at least two electric ducted fans positioned on the fuselage with at least one hydrogen fuel cell positioned within the Prandtl wing; and initiating an EW effect on the IAD site with an EW device carried by the SUAS, thereby interfering with at least one surface-to-air missile (SAM) system.

In one aspect, the method includes powering the EW device with the at least one hydrogen fuel cell.

In another aspect, the method includes powering the EW device and all on-board devices of the SUAS with the at least one hydrogen fuel cell.

In another aspect, the SUAS has a low radar cross-section.

In another aspect, the method includes flying the SUAS at a height above ground level (AGL) of less than 75 feet.

In another aspect, the method includes flying the SUAS at a velocity of at least 150 miles per hour (MPH).

In another aspect, the method includes flying the SUAS and maintaining a loitering velocity within the IAD site of substantially 75 MPH.

In another aspect, the EW device has a weight of substantially 4 kg.

In another aspect, the method includes flying the SUAS for at least 60 minutes, wherein the SUAS loiters over the IAD site for at least 30 minutes of the at least 60 minutes.

In another aspect, the method includes initiating the EW effect that comprises at least one of: transmitting and receiving RF signals; initiating EW management techniques against at least one of an emitter and receiver of the SAM system; and delivering and receiving RF based cyber effects.

In another aspect, the SUAS is launched near the IAD site in a location beyond a field-of-range of the SAM system.

In another aspect, the method includes launching a plurality of SUASs substantially concurrently.

In another aspect, the method includes crashing the SUAS on a ground surface, wherein prior to crashing, the SUAS self-sanitizes a memory of a computerized control system of the SUAS.

In another aspect, the method includes flying the SUAS with an autonomous flight controller, wherein terrain and obstacles along a flight path of the SUAS are sensed and communicated to the autonomous flight controller.

In another aspect, the method includes launching the SUAS from an armored box launcher.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 4 is a schematic view image of the inner components of the airframe of the SUAS of FIG. 1, in accordance with the first exemplary embodiment of the present disclosure.

FIG. 5 is a cross-sectional side view illustration of the Prandtl wing of the SUAS of FIG. 1, in accordance with the first exemplary embodiment of the present disclosure.

FIG. 6A-6C are isometric views of hydrogen fuel cells which can be used with the SUAS of FIG. 1, in accordance with the first exemplary embodiment of the present disclosure.

FIG. 11 is a flowchart illustrating a method of interfering with an Integrated Air Defense (IAD), in accordance with the first exemplary embodiment of the disclosure.

DETAILED DESCRIPTION

The subject disclosure is directed to providing an aircraft device, a system, and a method for countering IADs through the use of one or more SUASs. In particular, the SUAS is designed to be a low cost, launch-and-leave device which can be utilized for countering or interfering with IADs using EW and cyber effects, thereby allowing it to penetrate IADs to permanently or temporarily disable them. As will be described herein, the SUAS of the subject disclosure improves over the conventional systems through advantages in size, speed, and low radar cross section (RCS), thereby enabling stealthy ingress into IADs for the application of advanced EW techniques. While use of the SUAS may vary, in one example, SUAS is intended to interfere with an IAD site long enough to permit other forces to transit the area or strike the IAD site, at which point the SUAS can be crashed, and either recovered or discarded.

Figure 1:
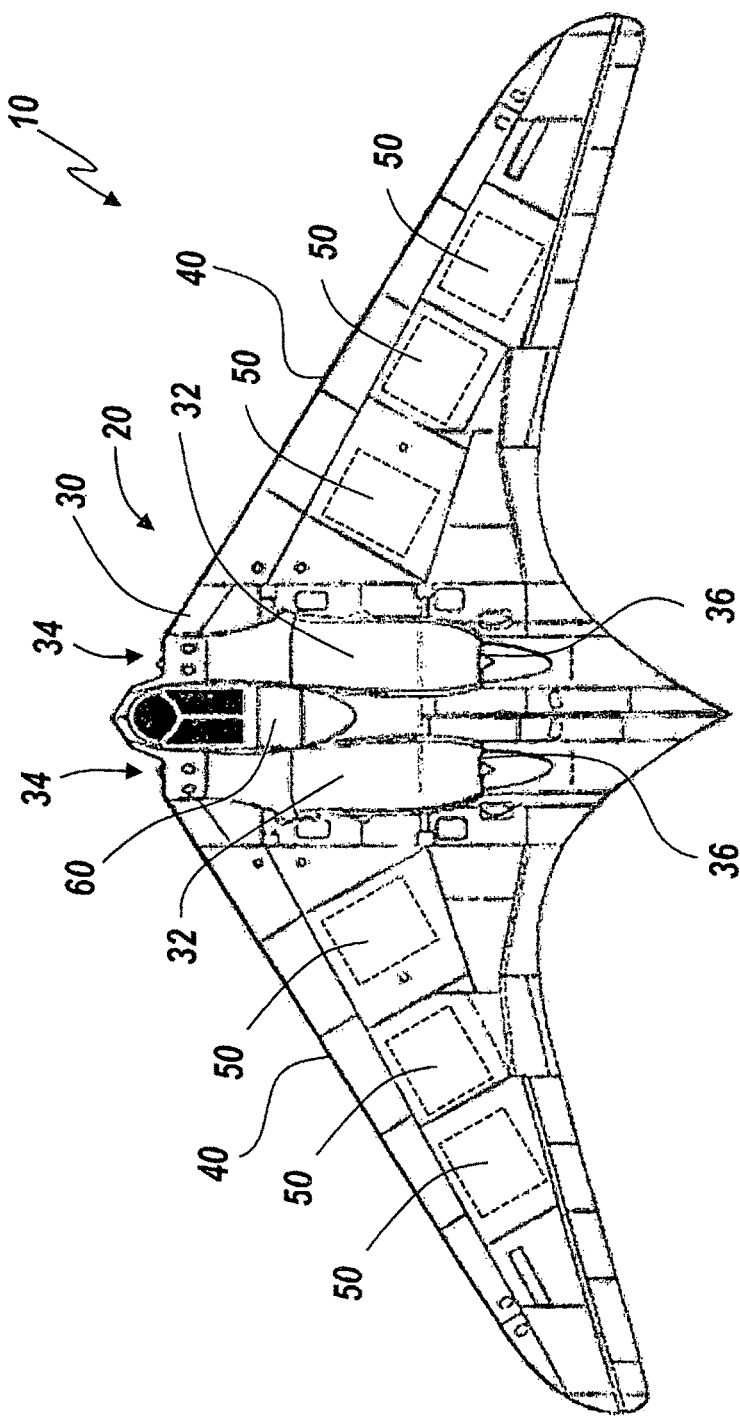
FIG. 1 is a top view illustration of the SUAS, in accordance with a first exemplary embodiment of the present disclosure.
Figure 2:
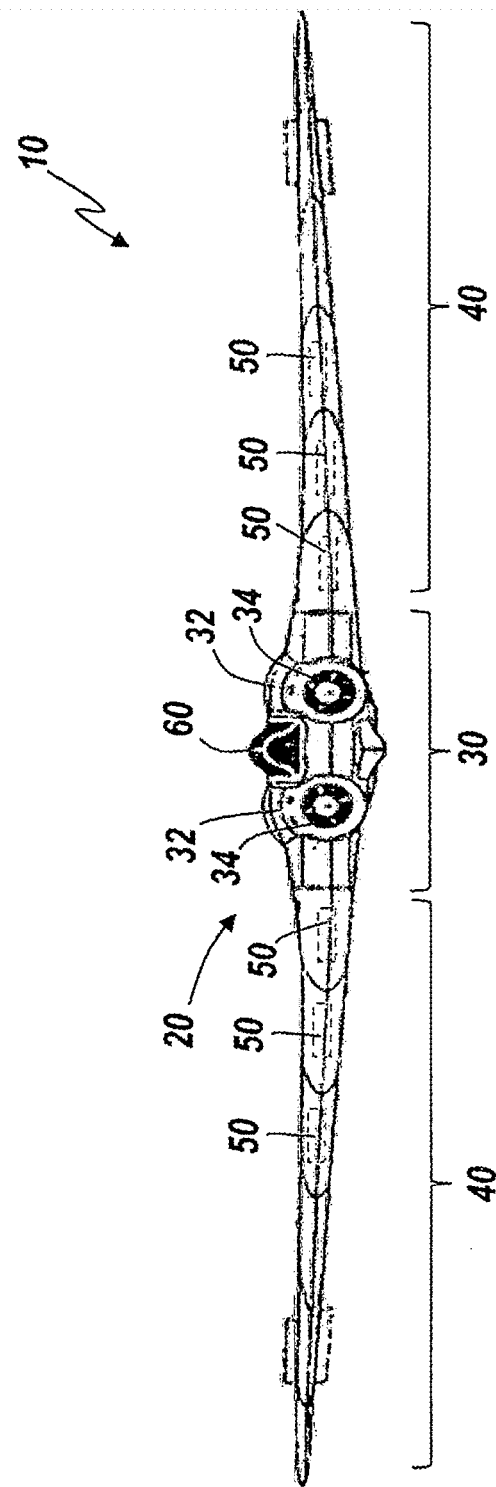
FIG. 2 is a front side view illustration of the SUAS of FIG. 1, in accordance with the first exemplary embodiment of the present disclosure.

FIG. 1 is a top view illustration of the SUAS 10, in accordance with a first exemplary embodiment of the present disclosure. FIG. 2 is a front side view illustration of the SUAS 10 of FIG. 1, in accordance with the first exemplary embodiment of the present disclosure. Relative to FIGS. 1-2, the SUAS 10 may include an airframe, generally designated by 20, having a fuselage 30 and a Prandtl wing 40. The SUAS 10 is designed as a small, unmanned aircraft which operates autonomously or by control from a remote position.

The SUAS 10 is further designed to be small enough to have a low radar cross-section, thereby allowing it to be used in operation settings without detection by RADAR systems, or to minimize detection through RADAR. While the size of the SUAS 10 may vary, in one example, the SUAS 10 has a wingspan of approximately 72 inches to 120 inches. As can be seen from FIG. 2, the height of the SUAS 10 may be substantially smaller than both the wingspan and the overall length of the aircraft.

The design of the airframe 20 of the SUAS 10 may include a fuselage 30 that has a unique shape, similar to the manned aircraft known in the industry as the Ho 229, which was introduced and designed by Reimar Horten. Similar to the Ho 229 design, the fuselage 30 may be integrated into the Prandtl wing 40 design to provide an airframe 20 which is formed as a body with integrated wings. This type of design may provide low-drag due to the seamlessly incorporated fuselage 30 with the Prandtl wing 40, which acts to remove unneeded surfaces of the aircraft and leads to an aircraft with a weight that is as low as possible.

The Prandtl wing 40 may be a low-drag wing based on the theories of Ludwig Prandtl, commonly known as the lifting-line theory, which predicts lift distribution over a three-dimensional wing based on geometry of the wing. Using the theories of Prandtl, the SUAS employs a Prandtl wing 40 which generally comprises two wing structures positioned on either side of the fuselage 30 which are tapered towards the rear of the fuselage 30. In one example, the Prandtl wing 40 may include a Prandtl-D wing. In contrast to conventional aircraft which have wings that contact a portion of the fuselage 30, the Prandtl wing 40 of the airframe 20 may be connected to the sides of the fuselage 30 along substantially the entirety of the length of the fuselage 30, thereby providing an aircraft with a 'flying wing' design. The design of the SUAS 10 prevents adverse yaw through diffusion of the wing vortices.

As shown in FIGS. 1-2, the SUAS 10 may be propelled using at least two electric ducted fans 32 positioned on the fuselage 30. Each of these electric ducted fans 32 may include an inlet 34 positioned on a front surface of the fuselage 30 and an outlet 36 positioned on a top surface of the fuselage 30. Incorporated in the Prandtl wing 40 is a power system of the SUAS 10 which has a plurality of hydrogen fuel cells 50, intrinsically positioned within the Prandtl wing 40 to distribute the weight of the fuel cells and to save space on the fuselage 30, thereby allowing the electric ducted fans 32 to be positioned on the fuselage. The fuselage 30 is designed to have a payload area positioned between the electric ducted fans 32, or between one of the electric ducted fans 32 and a boundary between the fuselage 30 and the Prandtl wing 40. The payload area is capable of removably carrying an EW payload 60. The hydrogen fuel cells 50 may provide operating power to the two electric ducted fans 32 and may also provide power to the EW payload 60, among other components of the SUAS 10, including flight control system.

Figure 3:
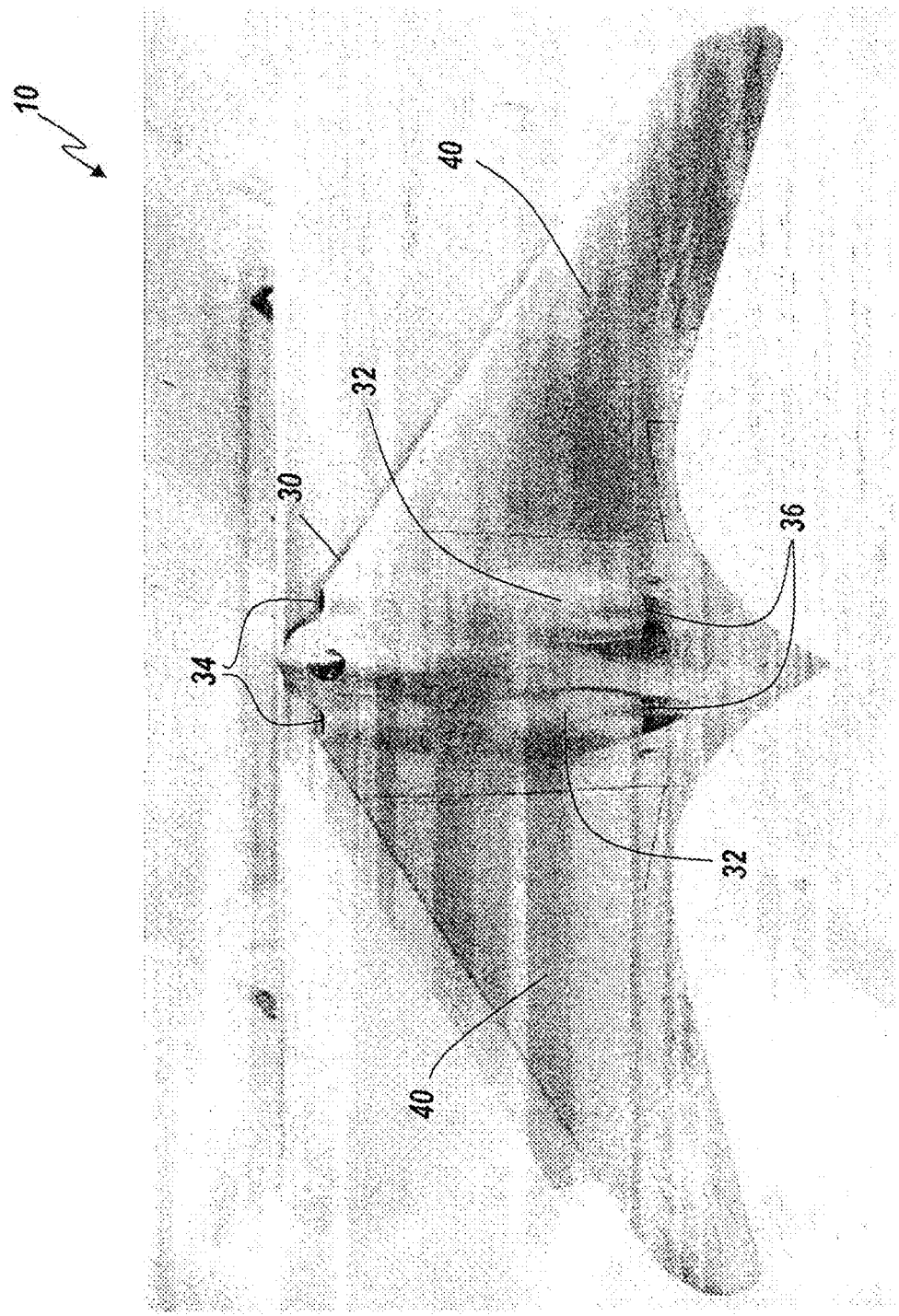
FIG. 3 is a top view image of the SUAS of FIG. 1, in accordance with the first exemplary embodiment of the present disclosure.

FIG. 3 is a top view image of the SUAS 10 of FIG. 1, in accordance with the first exemplary embodiment of the present disclosure. Specifically, FIG. 3 depicts the electric ducted fans 32 formed in the fuselage 30 of the SUAS 10. As shown, the inlets 34 for the electric ducted fans 32 may be positioned on a forward surface of the fuselage 30, thereby allowing air to enter the electric ducted fans 32 and contact the blades thereof. The outlets 36 of each of the electric ducted fans 32 may be positioned on a side of the fuselage 30 proximate to the rear of the fuselage 30. In use, air may be passed through the electric ducted fans 32 from the inlet 34 where turbines of the electric ducted fans 32 engage with the air to propel the SUAS 10 forward, and the air is eventually emitted from the outlets 36. The shape of the electric ducted fans 32 may be incorporated into the height of the fuselage 30, such that the surfaces of the fuselage 30 taper to the diametric sides of the electric ducted fans 32, thereby providing a fluid, low-drag air form.

FIG. 4 is a schematic view image of the inner components of the airframe 20 of the SUAS 10 of FIG. 1, in accordance with the first exemplary embodiment of the present disclosure. As shown, the fuselage 30 (FIGS. 1-3) of the SUAS 10 may be formed with structure components which are positioned interior of a skin of the SUAS 10. These structural components may include a fuselage frame 38 and wing trusses 42. The fuselage frame 38 may include a plurality of perpendicularly-positioned members which may be connected together using adhesives and mortise and tenon joints. The fuselage frame 38 is designed to allow motors 33 of the electric ducted fans 32 (FIGS. 1-3) to be positioned therein, within outlets positioned on either side thereof. For example, the fuselage frame 38 may define an airflow path through the fuselage frame 38 which connects the inlet and outlet of the electric ducted fans 32. The wing trusses 42, which are discussed further in detail relative to FIG. 5 may have the shape of the air form of the Prandtl wing 40, in that they have larger front end and a rear that tapers to a narrowed point. The wing trusses 42 and the fuselage frame 38 may have any number of cutouts to lessen the weight of the SUAS 10. It is noted that while various techniques can be used to construct the components of the Prandtl wing 40, one advantageous method of forming the wing trusses 42 is to construct them from 3D molding techniques.

FIG. 5 is a cross-sectional side view illustration of the Prandtl wing 40 of the SUAS 10 of FIG. 1, in accordance with the first exemplary embodiment of the present disclosure. The Prandtl wing 40 may include a number of different constructions with different components. In one example, the Prandtl wing 40 includes a plurality of wing trusses 42, each of which is positioned extending from a front edge of the Prandtl wing 40 to a rear, terminating edge thereof. An external carbon fiber wing skin 44 is bonded on the upper terminating edge 42a and lower terminating edge 42b of the wing trusses 42 to form the exterior surface of the Prandtl wing 40. The carbon fiber wing skin 44 may be constructed from a carbon fiber cloth material bonded to the wing trusses 42 using a lightweight resin, which when cured, allows the carbon fiber wing skin 44 to physically link the wing trusses 42 together. The use of wing trusses 42 which are connected together using adhesives and mortise and tenon techniques coupled with the use of a cured resin-impregnated carbon fiber cloth may allow the Prandtl wing 40 to have excellent thermal and physical geometric stability.

While the exterior skin of the SUAS 10 may be formed from the durable carbon fiber wing skin 44, an inner layer of the wing skin, i.e., internal skin 46, may be formed with a second substrate having a hexagonal pattern extruded thereon. The internal wing skin 46 may have an inwardly positioned printed hexagonal pattern, i.e., honeycomb pattern, extruded between an offset internal surface planar to the outer airfoil surface of the carbon fiber wing skin 44. The hexagonal pattern may be formed by 2D laser cutting composite frame sections or by 3D printing and/or a stereolithography process. This internal wing skin 46 may be positioned interior of the carbon fiber wing skin 44 and may be bonded to the interior surface of the carbon fiber material. The printed hexagonal pattern of the internal skin 46 may be sandwiched between an inner-most substrate or layer of the internal wing skin 46 and the inner-most surface of the carbon fiber wing skin 44. The internal wing skin 46 may also be positioned between opposing sidewalls 42c of the wing trusses 42, such that the internal wing skin 46 is connected to a side edge of the wing trusses 42 while the carbon fiber wing skin 44 is bonded to a top edge of the wing trusses 42. This design may allow the wing trusses 42 to fill the voids between the hexagonal/honeycomb structures of the interior wing skin 46 and the carbon fiber wing skin 44 to achieve structural rigidity.

As is also shown in FIG. 5, the hydrogen fuel cells 50 may be incorporated into the Prandtl wing 40, such that the wing structure of the Prandtl wing 40 is effectively built around the hydrogen fuel cell 50 using parametric designs for payload weight optimization. In this design, a hydrogen fuel cell 50 may be positioned between the at least two trusses 42 of the Prandtl wing 40. By intrinsically locating the hydrogen fuel cells 50 within the Prandtl wing 40, the weight of the hydrogen fuel cells 50 may be distributed across the Prandtl wing 40.

FIG. 6A-6C are isometric views of hydrogen fuel cells 50 which can be used with the SUAS 10 of FIG. 1, in accordance with the first exemplary embodiment of the present disclosure. Specifically, FIGS. 6A-6C illustrate hydrogen fuel cells 50 with different types of hydrogen fuel sources 52, all of which are used with a fuel cell power system 54 which converts the hydrogen fuel source 52 to electric power. FIG. 6A depicts a hydrogen fuel cell 50 which utilizes compressed hydrogen gas as the fuel source 52. The compressed gas fuel source 52 may include a high pressure, 300 Bar compressed hydrogen cylinder which has a low operating cost. The cylinder in which the fuel source 52 is housed may have different sizes to fit within the Prandtl wing of the SUAS. FIG. 6B utilizes liquid chemical hydrogen as a fuel source 52, which allows the hydrogen to be stored in an energy dense, nonflammable liquid solution which can be used to produce hydrogen gas on demand as needed. As shown, when a liquid chemical hydrogen is used as the fuel source 52, a hydrogenation system 56 may be required to generate the hydrogen gas which the fuel power cell system 54 uses. FIG. 6C illustrates the hydrogen fuel cell 50 as using a solid chemical hydrogen fuel source 52, which offers a theoretical 14% hydrogen storage by weight and has been shown to produce 7% hydrogen by weight in testing. Using a solid chemical hydrogen fuel source 52 may provide a more compact storage of hydrogen than gas or liquid storage units. Any of these hydrogen fuel cells 50 may be used with the SUAS.

Figure 7:
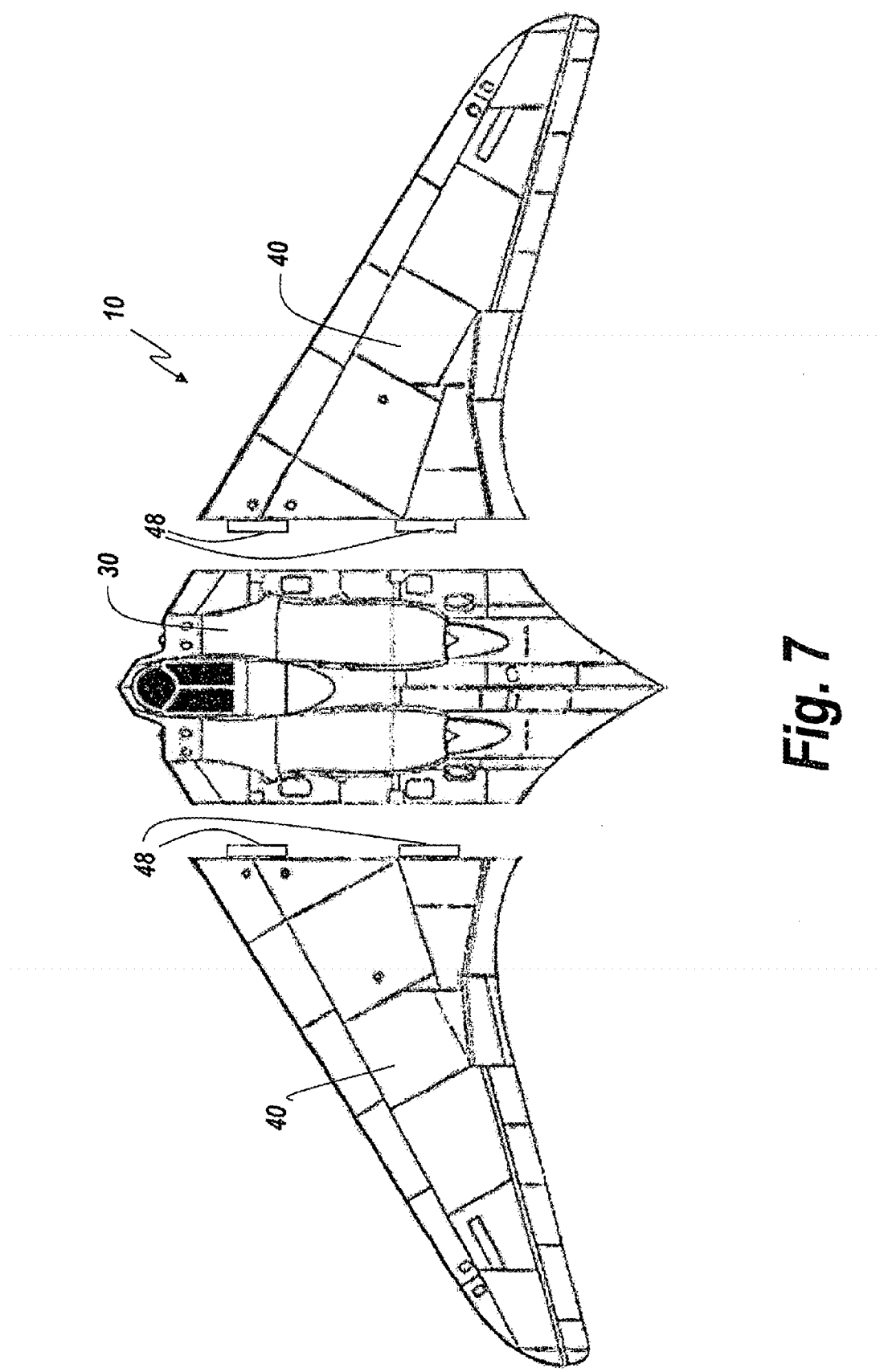
FIG. 7 is a top view, schematic illustration of the SUAS of FIG. 1, in accordance with the first exemplary embodiment of the present disclosure.

FIG. 7 is a top view, schematic illustration of the SUAS 10 of FIG. 1, in accordance with the first exemplary embodiment of the present disclosure. The SUAS 10 has been designed to allow for the wing structures of the Prandtl wing 40 to be removed from the fuselage 30. A locking mechanism 48 may be used to removably connect the Prandtl wing 40 structures to the sides of the fuselage 30. In addition to being removable, the Prandtl wing 40 structures may be interchangeable with wings of other UAV aircraft.

Figure 8:
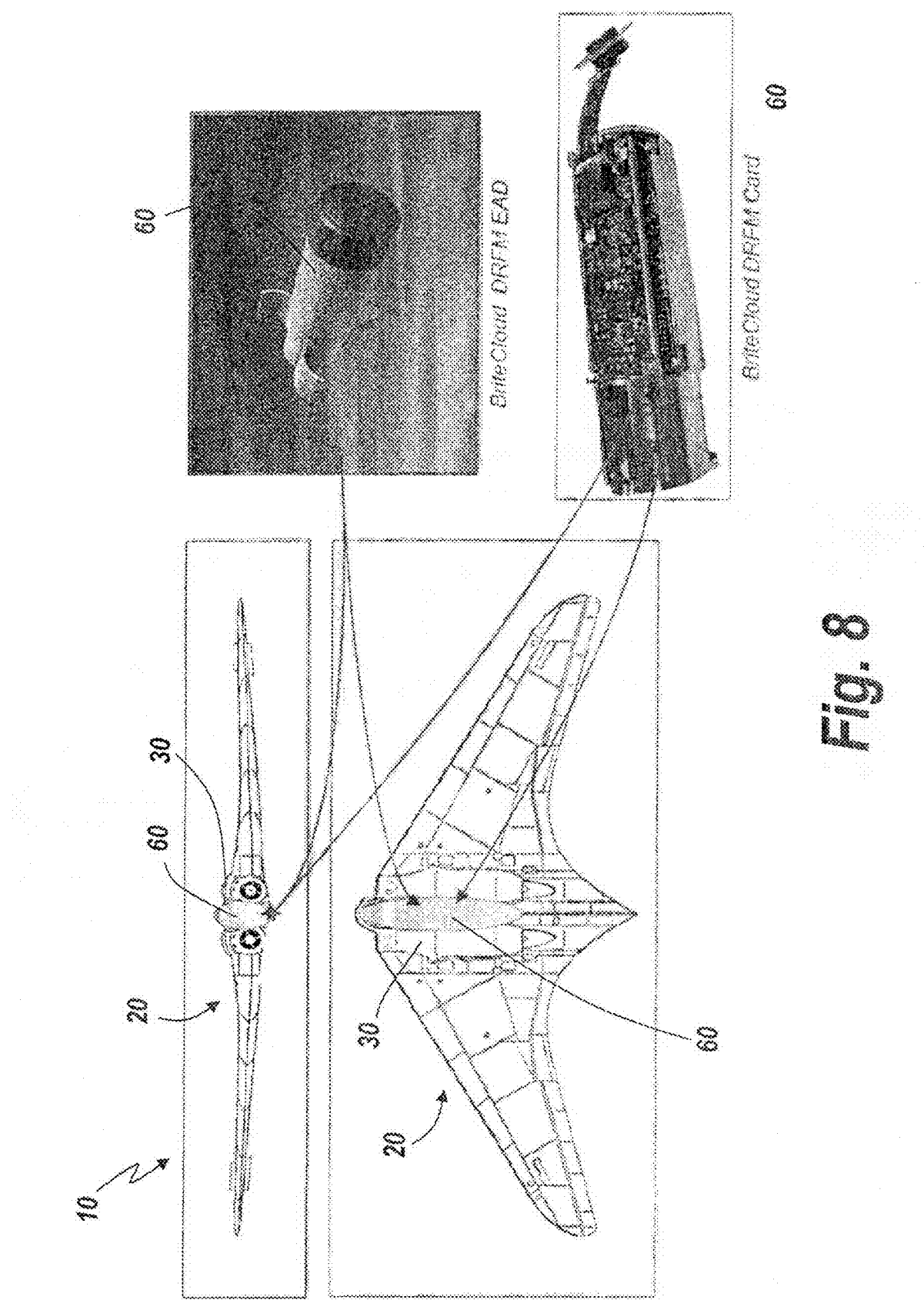
FIG. 8 is a schematic illustration of the EW payload for use with the SUAS of FIG. 1, in accordance with the first exemplary embodiment of the present disclosure.

FIG. 8 is a schematic illustration of the EW payload 60 for use with the SUAS 10 of FIG. 1, in accordance with the first exemplary embodiment of the present disclosure. The EW payload 60 may include any type of EW device which the SUAS 10 is capable of carrying. For example, the EW payload 60 may include a Digital Radio Frequency Memory (DRFM) system with Expendable Active Decoy (EAD) or another type of jamming system. In one example, the EW effect will be generated by a derivative of the TRL 8, Selex ES BriteCloud. DRFM EAD. The BriteCloud EAD may launch from the chaff/flare dispensers carried on many aircraft. This type of EW payload 60 may generate a DRFM countermeasure against advanced SAM threats. One benefit of this type of EW payload 60 is its ability to self-sanitize after use, which allows it to delete data, codes, and other information at the end of flight. Accordingly, after a mission has been completed, the SUAS 10 may be crashed into a ground surface without fear of an enemy gaining data carried by the EW payload 60. The SUAS 10 may integrate the BriteCloud DRFM card, housing, antenna set, and any other hardware and software components in to the payload area of the SUAS 10.

It is further noted that additional EW features may be incorporated into the EW payload. For example, Point Break light weight Software Defined Radio (SDR) could potentially be integrated into the SUAS 10. This SDR would enable the SUAS 10 to transmit and receive RF signals, advanced EW management techniques against emitters or receivers (e.g. GPS), and/or deliver and receive RF based cyber effects. In one example, this may allow the EW effect to include interfering with standard communication systems, such as Bluetooth related transmissions effecting the on board computer of automobiles, transmitting and receiving of RFID information, or disrupting Wi-Fi related effects and/or interactions.

The design and construction of the SUAS 10 described relative to FIGS. 1-8 may provide substantial benefits to military and intelligence operations by providing an autonomous high-speed, low visibility, low RCS, SUAS based on a fuel cell power for the delivery of EW and/or Cyber effects against IAD sites. The SUAS 10 would be capable of penetrating denied airspace to conduct electronic attacks without the expense or technology signature of swarming unmanned aerial vehicles (UAVs). To achieve this benefit, the SUAS 10 is designed from elements and characteristics regarded as highly challenging to today's Ground-Based Air Defense (GBAD) Sites/Systems (for example, as discussed in NATO Industrial Advisory Group (NIAG) Study Group (SG) Final Report SG-170, 31 Jul. 2013 and NIAG SG-188, 19 Jun. 2015) and to current counter-UAS systems. For example, the SUAS 10 is designed using many components that are readily available in the commercial market, such as navigation, flight control, and propulsion systems, in order to create a low cost, technologically 'finger print free' and non-attributable platform.

Figure 9:
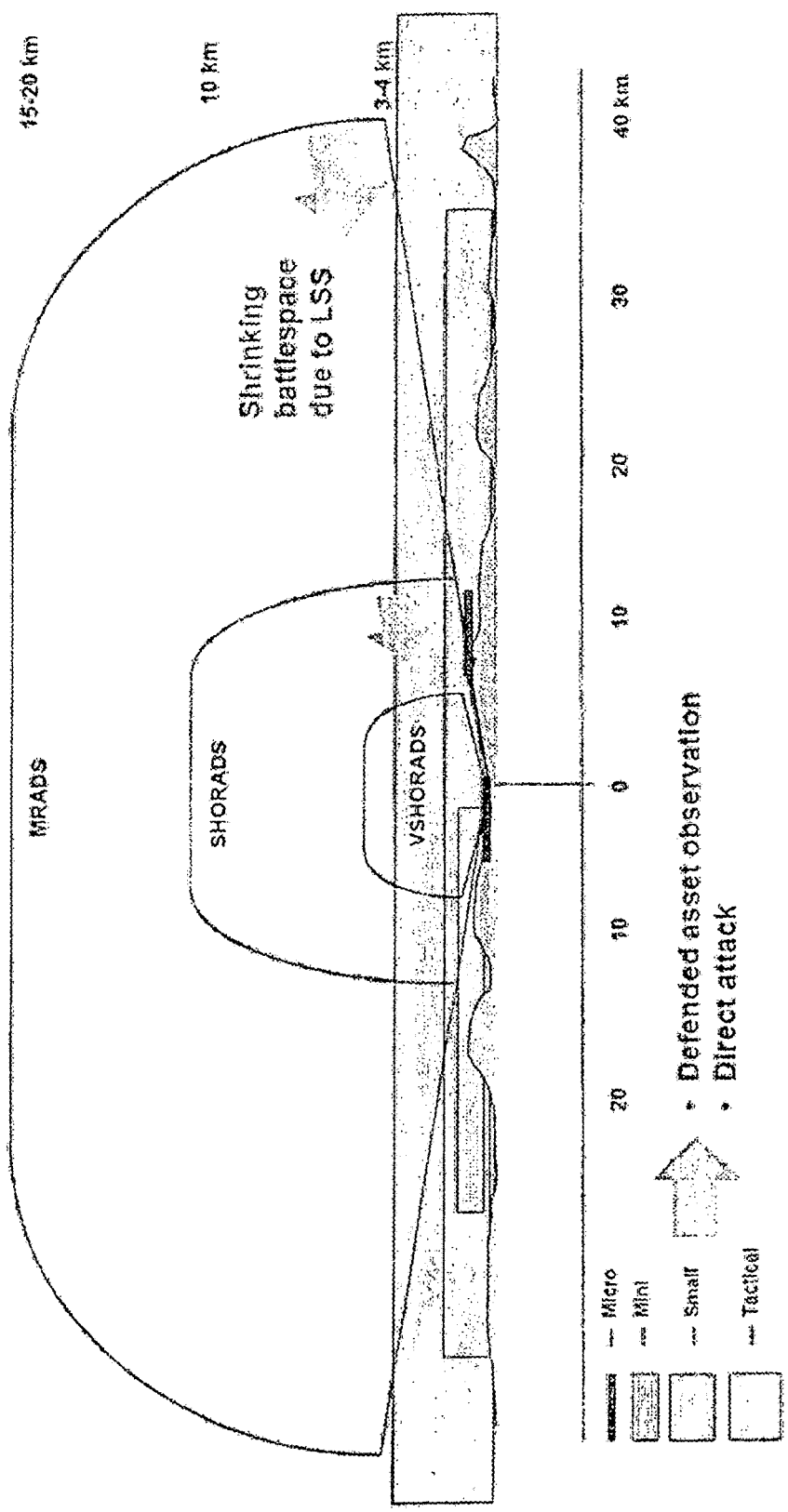
FIG. 9 is a schematic illustration of a typical Ground-Based Air Defense (GBAD) system in the low, slow, small (LLS) battlespace, in accordance with the first exemplary embodiment of the subject disclosure.

FIG. 9 is a schematic illustration of a typical GBAD system in the low, slow, small (LLS) battlespace, in accordance with the first exemplary embodiment of the subject disclosure. As shown, typical GBAD systems may have different designated ranges, including a medium range air defense system (MRADS), a short range air defense system (SHORADS), and a very short range air defense system (VSHORADS), each of which has a different field-of-range. For example, MRADS may be capable of detecting and acting on a target which is located within 15-20 kilometers of the system, whereas SHORADS may operate within a 10 kilometer range, and VSHORADS may operate at approximately a 3-4 kilometer range. With the increasing presence of a LSS battlespace in operational environments today, the effective battlespace available shrinks. In one example, as shown in FIG. 9, the space in which a direct attack or a defended asset observation may be completed with a SUAS may include a larger 'tactical zone, a 'small' zone, a 'mini' zone, and a 'micro' zone. Depending on the type of GBAD system that is used in a particular setting, the SUAS of the subject disclosure may be capable of operating in the zones depicted in FIG. 9 to successful effect EW against the GBAD.

Figure 10:
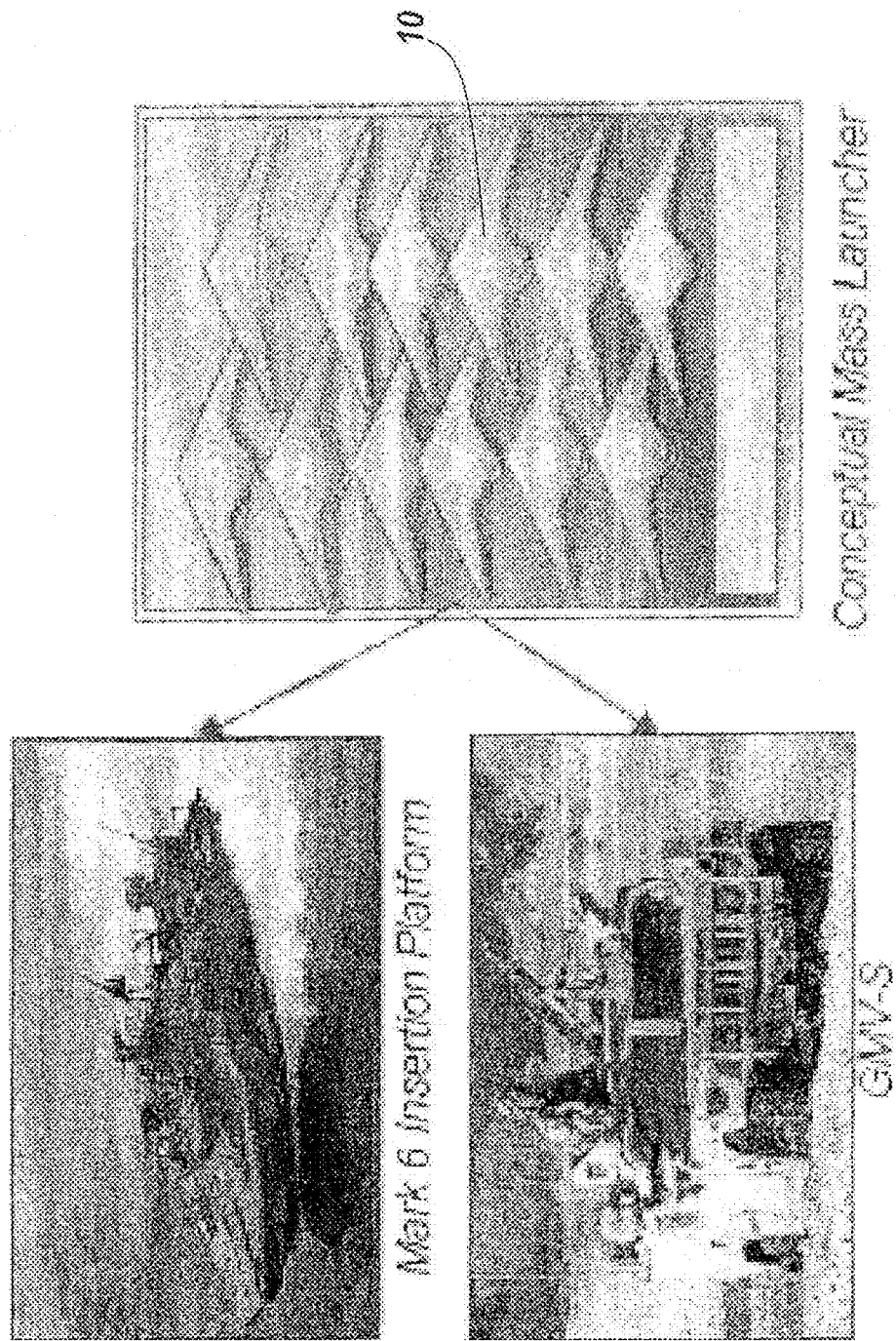
FIG. 10 is a schematic illustration of launching concepts of the SUAS, in accordance with the first exemplary embodiment of the subject disclosure.

FIG. 10 is a schematic illustration of launching concepts of the SUAS 10, in accordance with the first exemplary embodiment of the subject disclosure. While the use of a single SUAS 10 may provide significant benefits to the industry, it may be common for a plurality of SUASs 10 to be used together for a single operation. When a plurality of SUASs 10 is used, each of the devices may be equipped with similar or different EW devices. The SUAS 10 may be launched from different platforms, including a simple, portable 'box launcher' carried by personnel located near the GBAD or from vehicles, such as the GMV-S or the Mark 6 Insertion Platform.

The following is an operational scenario example of how the SUAS 10 can be used to administer EW against an IAD. The scenario is based on military forces, such as U.S. Forces, needing to open a corridor for an air strike through denied air space and against facilities protected by S-300VMs SAMs. One hour prior to take-off, 12 SUASs 10 are launched from a simple, portable 'box launcher' carried by Special Operations Forces stationed just outside the S-300 surveillance radar range. The SUASs 10 fly at low altitude and high speed arriving over the S-300 site several minutes before an allied strike package enters the surveillance radar bubble. The SUASs 10 initiate the EW techniques with their EW payloads causing confusion in the IAD Command and Control (C2) center, permitting the strike package to transit unimpeded through the S-300 "kill zone" and deliver a kinetic package on the IAD site before the site can engage the U.S. forces. The SUAS 10 units continue to operate while the EW package goes into acquisition mode and searches for new emissions to counter. When all fuel from the hydrogen fuel cells in the SUASs 10 is expended, and after a time period permitting the U.S. strike package to safely exit the area, the EW unit self-sanitizes its computerized memory, deleting any and all code, and the SUASs 10 crash to earth.

To be successful with this type of mission, the SUAS 10 is designed to be capable of meeting specific requirements, such as the publically available specifications of the Russian Antey-2500 (S-300VM). These requirements include the ability to autonomously infiltrate an IAD site at an altitude or AGL of less than 75 feet in excess of 150 mph, the ability to maintain a loiter speed of 75 mph, the ability to carry a 4 Kg EW/Cyber payload, and the ability to operate for the duration of a flight time of 60 minutes at a minimum, 30 minutes of which include loiter time over the IAD site while emitting EW.

FIG. 11 is a flowchart 100 illustrating a method of interfering with an Integrated Air Defense (IAD), in accordance with the first exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 102, a SUAS having a fuselage and a Prandtl wing is launched near an IAD site. At least two electric ducted fans positioned on the fuselage are powered with at least one hydrogen fuel cell positioned within the Prandtl wing (block 104). An EW effect is initiated on the IAD site with an EW device carried by the SUAS, thereby interfering with at least one SAM system (block 106). The method may include any number of additional steps, processes, and functions, including any disclosed relative to any other figure of this disclosure. For example, the EW device and all other on-board devices of the SUAS may be powered with the at least one hydrogen fuel cell.

To meet the operational requirements noted previously, the SUAS may have a low radar cross-section and may be capable of flying a height above ground level (AGL) of less than 75 feet, at a velocity of at least 150 miles per hour (MPH), and while carrying an EW device has a weight of substantially 4 kg. The SUAS may be capable of maintaining a flight having a loitering velocity within the IAD site of substantially 75 MPH. For example, with a 60 minute total flight time, the SUAS may loiter over the IAD site for at least 30 minutes of the at least 60 minutes. A single SUAS may be launched near the IAD site in a location beyond a field-of-range of the SAM system from an armored box launcher, or similar launching device. Similarly, a plurality of SUASs may be launched concurrently in the same location from similar launching devices.

The method may further include a number of processes relative to the initiating of the EW effect on the IAD. For example, the EW effect may include transmitting and receiving RF signals, initiating EW management techniques against at least one of an emitter and receiver of the SAM system, and/or delivering and receiving RF based cyber effects. While in flight, prior to or during emission of the EW effect, the SUAS may be controlled with an autonomous flight controller which can sense and identify various terrains and obstacles along a flight path of the SUAS and communicate those terrains and obstacles to the autonomous flight controller. When a mission is complete, the SUAS may be crashed to the ground surface. Prior to crashing, the SUAS may self-sanitize a memory of its computerized control system to prevent unauthorized individuals from accessing sensitive data carried by the SUAS and/or the EW payload.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A small unmanned aircraft system (SUAS) comprising:
   an airframe having a fuselage and a Prandtl wing;
   a power system having a plurality of hydrogen fuel cells positioned within the Prandtl wing; and
   at least two electric ducted fans positioned on the fuselage, wherein the at least two ducted fans are powered by at least a portion of the plurality of hydrogen fuel cells;
   wherein the Prandtl wing comprises two Prandtl wing structures, wherein each of the two Prandtl wing structures is formed from at least two trusses connected with a carbon fiber wing skin, wherein the carbon fiber win skin is bonded to terminating edges of the at least two trusses; and wherein the plurality of hydrogen fuel cells have different sizes configured to fit positioned between the at least two trusses.

2. The SUAS of claim 1, wherein the fuselage further comprises a Ho 229 fuselage.

3. The SUAS of claim 1, wherein each of the at least two electric ducted fans positioned on the fuselage further comprise an inlet positioned on a front surface of the fuselage and an outlet positioned on a top surface of the fuselage.

4. The SUAS of claim 1, wherein the Prandtl wing further comprises a Prandtl-D wing.

5. The SUAS of claim 1, wherein each of the structures are removably connectable to the fuselage with a mechanical locking mechanism.

6. The SUAS of claim 1, wherein a wingspan of the Prandtl wing is substantially between 72 inches and 120 inches.

7. The SUAS of claim 1, wherein the at least two trusses are connected to at least one spar with an adhesive material and at least one mortise and tenon joint.

8. The SUAS of claim 1, further comprising an internal wing skin positioned interior of the carbon fiber wing skin, wherein the internal wing skin comprises an extruded hexagonal composite material.

9. The SUAS of claim 8, wherein the internal wing skin is positioned between opposing sidewalls of the at least two trusses.

10. The SUAS of claim 1, wherein the extruded hexagonal composite material of the internal wing skin is sandwiched between a substrate of the internal wing skin and the carbon fiber wing skin.

11. The SUAS of claim 1, further comprising an electronic warfare (EW) payload carried by the fuselage.

12. The SUAS of claim 11, wherein the EW payload is carried by the fuselage between the at least two electric ducted fans.

13. The SUAS of claim 11, wherein the EW payload receives power from the at least one of the plurality of hydrogen fuel cells.

14. The SUAS of claim 1, wherein the hydrogen fuel cells are selected from hydrogen fuel cells which utilize a compressed hydrogen gas fuel source, a liquid chemical hydrogen fuel source, and a solid chemical hydrogen fuel source.

15. A system for conducting electronic warfare on a target site, the system comprising:
a small unmanned aircraft system (SUAS) having a fuselage and a Prandtl wing, wherein at least two electric ducted fans are positioned on the fuselage;
a power system integrated into the SUAS, the power system having a plurality of hydrogen fuel cells positioned within the Prandtl wing; and
an electronic warfare (EW) payload carried by the fuselage, wherein the EW payload and the at least two electric ducted fans are powered by the at least one or plurality of hydrogen fuel cells;
wherein the Prandtl wing comprises two Prandtl wing structures, wherein each of the two Prandtl wing structures is formed from at least two trusses connected with a carbon fiber wing skin, wherein the carbon fiber wing skin is bonded to terminating edges of the at least two trusses; and
wherein the plurality of hydrogen fuel cells have different sizes configured to fit positioned between the at least two trusses.

16. The system of claim 15, wherein the EW payload further comprises a Digital Radio Frequency Memory Expendable Active Decoy (DRFM EAD).

17. The system of claim 15, wherein internal wing skin comprising an extruded hexagonal composite material is positioned abutting the carbon fiber wing skin.

18. The system of claim 15, wherein the hydrogen fuel cells are selected from hydrogen fuel cells which utilize a compressed hydrogen gas fuel source, a liquid chemical hydrogen fuel source, and a solid chemical hydrogen fuel source.

19. A method of interfering with an Integrated Air Defense (IAD), the method comprising:
launching a small unmanned aircraft system (SUAS) as claimed in claim 1, said SUAS having a fuselage and a Prandtl wing near an IAD site;
powering at least two electric ducted fans positioned on the fuselage with the hydrogen fuel cells positioned within the Prandtl wing; and
initiating an electronic warfare (EW) effect on the IAD site with an EW device carried by the SUAS, thereby interfering with at least one surface-to-air missile (SAM) system.

20. The method of claim 19, further comprising powering the EW device with the at least one hydrogen fuel cell.

21. The method of claim 19, further comprising powering the EW device and all on-board devices of the SUAS with the at least one hydrogen fuel cell.

22. The method of claim 19, wherein the SUAS has a low radar cross-section.

23. The method of claim 19, further comprising flying the SUAS at a height above ground level (AGL) of less than 75 feet.

24. The method of claim 19, further comprising flying the SUAS at a velocity of at least 150 miles per hour (MPH).

25. The method of claim 19, further comprising flying the SUAS and maintaining a loitering velocity within the IAD site of substantially 75 MPH.

26. The method of claim 19, wherein the EW device has a weight of substantially 4 kg.

27. The method of claim 19, further comprising flying the SUAS for at least 60 minutes, wherein the SUAS loiters over the IAD site for at least 30 minutes of the at least 60 minutes.

28. The method of claim 19, wherein initiating the EW effect further comprises at least one of:
transmitting and receiving RF signals;
initiating EW management techniques against at least one of an emitter and receiver of the SAM system; and
delivering and receiving RF based cyber effects.

29. The method of claim 19, wherein the SUAS is launched near the IAD site in a location beyond a field-of-range of the SAM system.

30. The method of claim 19, wherein launching the SUAS further comprises launching a plurality of SUASs substantially concurrently.

31. The method of claim 19, further comprising crashing the SUAS on a ground surface, wherein prior to crashing, the SUAS self-sanitizes a memory of a computerized control system of the SUAS.

32. The method of claim 19, further comprising flying the SUAS with an autonomous flight controller, wherein terrain and obstacles along a flight path of the SUAS are sensed and communicated to the autonomous flight controller.

33. The method of claim 19, wherein launching the SUAS further comprises launching from an armored box launcher.

* * * * *

UNITED STATES PATENT AND TRADEMARK OFFICE
CERTIFICATE OF CORRECTION

PATENT NO. : 10,457,391 B2
APPLICATION NO. : 15/071018
DATED : October 29, 2019
INVENTOR(S) : Matthew Keegan and Stephen Leonard Engelson Wyatt It is certified that error appears in the above-identified patent and that said Letters Patent is hereby corrected as shown below:

In the Claims

Claim 1, Column 10, Line 66 "win skin" should be --wing skin--

Claim 17, Column 12, Line 4 "wherein internal" should be --wherein an internal--

Signed and Sealed this
Seventh Day of April, 2020

Andrei Iancu
*Director of the United States Patent and Trademark Office*